(12) United States Patent
Feng et al.

(10) Patent No.: US 11,815,912 B2
(45) Date of Patent: Nov. 14, 2023

(54) STABILITY CONTROL METHOD AND DEVICE BASED ON PARTICLE ACTIVE DISTURBANCE REJECTION

(71) Applicant: Aerospace Information Research Institute, Chinese Academy of Sciences, Beijing (CN)

(72) Inventors: Hui Feng, Beijing (CN); Jiacheng Ma, Xingtai (CN); Sheng Wang, Beijing (CN); Lei Ao, Beijing (CN); Xiangqiang Zhang, Beijing (CN); Tao Qiao, Beijing (CN)

(73) Assignee: Aerospace Information Research Institute, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/087,793

(22) Filed: Dec. 22, 2022

(65) Prior Publication Data
US 2023/0213948 A1 Jul. 6, 2023

(30) Foreign Application Priority Data
Dec. 30, 2021 (CN) .......................... 202111638296.6

(51) Int. Cl.
*G05D 1/08* (2006.01)
*B64C 39/02* (2023.01)
(Continued)

(52) U.S. Cl.
CPC .............. *G05D 1/0825* (2013.01); *B64B 1/50* (2013.01); *B64B 1/40* (2013.01); *B64C 39/022* (2013.01)

(58) Field of Classification Search
CPC ......... B64C 13/16; B64C 27/02; B64C 31/06; B64C 39/022; B64B 1/12; B64B 1/20;
(Continued)

(56) References Cited

U.S. PATENT DOCUMENTS

2012/0234964 A1* 9/2012 Heppe ..................... B64C 37/02
244/30
2017/0203827 A1* 7/2017 Marcum ................... B64B 1/58
(Continued)

FOREIGN PATENT DOCUMENTS

CN 104267743 A * 1/2015
CN 105182984 A * 12/2015
(Continued)

OTHER PUBLICATIONS

Zhu, Erlin et al., "Airship horizontal trajectory tracking control based on Active Disturbance Rejection Control (ADRC)", Nonlinear Dyn (2014) 75:725-734, Volumn 75 Issue 4, Mar. 2014, Springer, pp. 725-734 (Year: 2014).*
(Continued)

*Primary Examiner* — David A Testardi
(74) *Attorney, Agent, or Firm* — Zhigang Ma

(57) ABSTRACT

A stability control method and device based on particle active disturbance rejection are provided. The method includes: establishing an active disturbance rejection controller model based on a dynamic model and a speed loop control model of a tethered balloon system, where the speed loop control model is established through theoretical modeling of executive components of a control system of the tethered balloon system; and optimizing to-be-optimized parameters of the active disturbance rejection controller model using a particle swarm optimization algorithm, determining an optimal active disturbance rejection controller model, and using the optimal active disturbance rejection controller model to implement stability control of a photoelectric pod. An active disturbance rejection controller is optimized by using a particle swarm optimization algorithm, which can effectively isolate the internal and external dis-
(Continued)

turbances of the photoelectric pod and improve the imaging stability of the photoelectric pod.

7 Claims, 6 Drawing Sheets

(51) Int. Cl.
*B64B 1/50* (2006.01)
*B64B 1/40* (2006.01)

(58) Field of Classification Search
CPC .... B64B 1/30; B64B 1/36; B64B 1/50; B64B 1/40; B64U 10/13; B64U 10/30; B64U 2101/30; B64U 2201/202; G05D 1/0204; G05D 1/0866; G05D 1/0825; G05B 13/042
See application file for complete search history.

(56) References Cited

U.S. PATENT DOCUMENTS

| | | | | |
|---|---|---|---|---|
| 2018/0135798 A1* | 5/2018 | Griffin | | G05B 6/02 |
| 2018/0141641 A1* | 5/2018 | Griffin | | G05D 1/0204 |
| 2018/0286255 A1* | 10/2018 | Beth | | B64B 1/06 |
| 2020/0108903 A1* | 4/2020 | Lee | | B64C 39/022 |
| 2021/0245898 A1* | 8/2021 | Liu | | G06F 30/15 |
| 2023/0182883 A1* | 6/2023 | Farley | | B64B 1/40 244/31 |

FOREIGN PATENT DOCUMENTS

| | | | | |
|---|---|---|---|---|
| CN | 109188901 A | * | 1/2019 | ........... G05B 13/042 |
| CN | 109856976 A | * | 6/2019 | |
| CN | 110543123 A | * | 12/2019 | ......... G05B 19/0423 |
| CN | 112668252 A | * | 4/2021 | |
| CN | 113759722 A | * | 12/2021 | |
| CN | 113985740 A | * | 1/2022 | |
| CN | 114488792 A | * | 5/2022 | ........... G05B 13/042 |

OTHER PUBLICATIONS

Zhu, Qixuan et al., "Improved ADRC of Airborne Electro-optical Stabilized Platform", Advances in Engineering Research, vol. 140, 2nd International Conference on Electrical, Control and Automation Engineering (ECAE 2017), Atlantis Press, 6 pages (Year: 2017).*
Yang, Shusheng et al., "Predictive Active Disturbance Rejection Control of Pan-tilt Visual Tracking System with Parameter Optimization", 2020 IEEE 3rd International Conference on Automation, Electronics and Electrical Engineering (AUTEEE), Nov. 20-22, 2020, Shenyang, China, pp. 19-24 (Year: 2020).*
Google machine translation of CN 114488792 A (original CN document published May 13, 2022) (Year: 2022).*
FIT machine translation of CN 114488792 A (original CN document published May 13, 2022) (Year: 2022).*
"Cascade active disturbance rejection control algorithm for airborne photoelectric tracking and aiming pod", Liu Zhiqiang et al., "Foreign Electronic Measurement Technology", vol. 39 No. 9, pp. 53-57 (Sep. 2020).
"An ADRC Flight Controller Design Method Based on PSO Algorithm", Yang Tingting et al., "Computer Simulation", vol. 26 No. 9, pp. 59-69 (2009).
"Time-domain response analysis of a tethered aerostat", Zhang Xiangqiang et al., "Journal of Beijing University of Aeronautics and Astronautics", vol. 32 No. 9, pp. 1015-1018 (Sep. 2006).
CNIPA, Notification of a First Office Action for CN202111638296.6, dated Feb. 9, 2022.
Aerospace Information Research Institute, Chinese Academy of Sciences (Applicant), Reply to Notification of a First Office Action for CN202111638296.6, w/ (allowed) replacement claims, Feb. 15, 2022.
CNIPA, Notification to grant patent right for invention in CN202111638296.6, dated Feb. 26, 2022.

\* cited by examiner

STABILITY CONTROL METHOD AND DEVICE BASED ON PARTICLE ACTIVE DISTURBANCE REJECTION

TECHNICAL FIELD

The present disclosure relates to the technical field of aircraft control, and in particularly, to a stability control method and device based on particle active disturbance rejection.

DESCRIPTION OF RELATED ART

A tethered balloon has some advantages, for example, staying in the air for a long time, carrying a heavy payload, etc. After the tethered balloon is equipped with a photoelectric task load system, it can be used for different applications such as monitoring, ground reconnaissance, remote sensing observation, etc. Facing the increasingly urgent application requirements, for example, border defense, coastal defense, scientific exploration, etc., using of a tethered-balloon-based photoelectric pod system for regional fine monitoring is paid more and more attention, and the tethered-balloon-based photoelectric pod system will play a huge role in the fields of national economy, scientific research and national defense in the future.

At present, many control methods are proposed for the stability control of a photoelectric pod, such as the proportion-proportion-differentiation (PID) control algorithm, the variable structure control algorithm, the active disturbance rejection control (ADRC) algorithm, the intelligent control algorithm, and the robust control algorithm. Existing photoelectric pod control methods are mostly used in an airborne platform, a vehicle-mounted platform, a ground-based platform and other platforms, but the research and development of a photoelectric pod based on an aerostat platform such as a tethered balloon platform is basically blank.

At present, the stability control of the photoelectric pod based on the tethered balloon platform is faced with many limitations, mainly in the following aspects.

1) Limited by the structure of the tethered balloon platform itself, the tethered balloon platform is easily affected by the change of the wind direction and the wind force when it is in the air, and it will swing randomly in three directions: a rolling direction, a pitching direction and a yawing direction. It is difficult to control the attitude of the tethered balloon tethered balloon, and a visual axis of a sensor in the photoelectric pod often changes randomly. 2) Limited by the influence of the wind, when a wind direction changes too fast, the tethered balloon platform is disturbed and rotates. As such, in order to ensure effective tracking, it is necessary to start and stop a motor frequently to control a direction of a photoelectric sensor, and thus a friction moment and a wind resistance moment change greatly. It is difficult to ensure rapidity while having high stability. 3) Limited by a rotating speed of a rotating shaft of the photoelectric pod, when the wind direction changes rapidly, a rotating speed of the tethered balloon platform caused by the disturbance may exceed the rotating speed of the rotating shaft of the photoelectric pod, thereby making it easy to "lose" a tracking target and difficult to achieve stable tracking of the tracking target.

SUMMARY

The present disclosure provides a stability control method and system based on particle active disturbance rejection, which are used to fill the gap of the prior art in the stability control of the photoelectric pod based on the tethered balloon platform.

In a first aspect, an embodiment of the present disclosure provides a stability control method based on particle active disturbance rejection, which includes:

establishing an active disturbance rejection controller model according to a dynamic model and a speed loop control model of a tethered balloon system, where the speed loop control model is established through theoretical modeling of executive components of a control system of the tethered balloon system; and optimizing to-be-optimized parameters of the active disturbance rejection controller model using a particle swarm optimization algorithm, determining an optimal active disturbance rejection controller model, and using the optimal active disturbance rejection controller model to implement stability control of a photoelectric pod.

According to the stability control method based on particle active disturbance rejection of the present disclosure, the dynamic model of the tethered balloon system consists of: a transient motion equation of the tethered balloon, a boundary condition of an anchor point, a boundary condition of a master node, a steady motion equation of the tethered balloon, and a differential coupling dynamic equation of a cable.

According to the stability control method based on particle active disturbance rejection of the present disclosure, the transient motion equation of the tethered balloon is expressed as the following formula:

$$M_1 \dot{V} + C_{RB} V = \tau_{RB};$$

where the boundary condition of the anchor point is expressed as the following formula:

$$[V_{x0}\ V_{y0}\ V_{z0}]^T = (L_{ce}) T [V_{t0}\ V_{n0}\ V_{b0}]^T;$$

where the boundary condition of the master node is expressed as the following formula:

$$L_{ce}[V_{tN}\ V_{nN}\ V_{bN}]^T = V_B + \omega \times R_B;$$

where the steady motion equation of the tethered balloon is expressed as the following formula:

$$\begin{bmatrix} p \\ q \\ r \end{bmatrix} = \begin{bmatrix} 1 & 0 & -\sin\theta \\ 0 & \cos\phi & \sin\phi\cos\theta \\ 0 & -\sin\phi & \cos\phi\cos\theta \end{bmatrix} \begin{bmatrix} \dot{\phi} \\ \dot{\theta} \\ \dot{\psi} \end{bmatrix};$$

where a dynamic equation of the cable is expressed as the following formula:

$$M \frac{\partial Y}{\partial s} = N \frac{\partial Y}{\partial t} + q;$$

where the differential coupling dynamic equation of the cable is expressed as the following formula:

$$M_{j+1/2}^i(Y_{j+1}^i - Y_j^i)/\Delta S + M_{j+1/2}^{i+1}(Y_{j+1}^{i+1} - Y_j^{i+1})/\Delta S =$$
$$N_j^{i+1/2}(Y_j^{i+1} - Y_j^i)/\Delta t + N_{j+1}^{i+1/2}(Y_{j+1}^{i+1} - Y_{j+1}^i)/\Delta t + q_{j+1/2}^i + q_{j+1/2}^{i+1}$$
$$Y_{j+1/2} = \frac{1}{2}(Y_j + Y_{j+1}),$$

where $M_1$ represents a mass matrix, M and N represent intermediate result matrices; q represents a force matrix; Y represents a state matrix $[T\ V_t\ V_n\ V_b\ \beta\ \gamma]^T$ of the cable, where $\beta$ represents an azimuth angle of the cable, $\gamma$ represents an inclination angle of the cable, $V_n$, $V_b$, and $V_t$ respectively represent components of a speed of the cable in a local coordinate system CFS; $\tau_{RB}$ represents a projection of a sum of an inertia force and an aerodynamic force of the cable in a body axis system BFS of the tethered balloon; V represents a speed of a sphere of the tethered balloon in the body axis system BFS of the tethered balloon; $\dot{V}$ is a derivative of V; $C_{RB}$ represents a dynamic moment of rotation; $[V_{t0}\ V_{n0}\ V_{b0}]^T$ represents a speed of the cable in the local coordinate system CFS of the cable; $L_{ce}$ represents a coordinate transformation matrix between the ground coordinate system EFS and the local coordinate system CFS; $[V_{x0}\ V_{y0}\ V_{z0}]^T$ represents a speed of the anchor point in the ground coordinate system EFS; $[V_{tN}\ V_{nN}\ V_{bN}]^T$ represents a speed of the n-th node in the local coordinate system CFS; $R_B$ represents a vector of a node B in the body axis system BFS; $V_B$ represents a speed of the node B in the body axis system BFS; and $\omega$ represents a motor angular velocity of a rotating shaft of the photoelectric pod; [p, q, r] respectively represents rotational angular velocities of the tethered balloon in the body axis system BFS, and $\psi$, $\theta$, $\phi$ represents a yaw angle, a pitch angle and a roll angle of the sphere of the tethered balloon, respectively; $M_j^i$, $N_j^i$, $q_j^i$, and $Y_j^i$ are corresponding values in a moment i and at a position j; $\Delta S$ represents a micro segmentation of the cable; and $\Delta t$ represents a micro segmentation of time.

According to the stability control method based on particle active disturbance rejection of the present disclosure, the motor transfer function is expressed as the following formula:

$$G'(s) = \frac{w(s)}{U_a(s)} = \frac{C_m}{JL_a s^2 + JR_a s + C_e C_m};$$

where the transfer function of the speed gyro is expressed as the following formula:

$$G''(s) = G_g(s);$$

where the transfer function of the power amplifier is expressed as the following formula:

$$G'''(s) = K_{pwm};$$

where G'(s), G''(s), and G'''(s) represent the motor transfer function, the transfer function of the speed gyro, and the transfer function of the power amplifier, respectively; $L_a$ represents an armature winding inductance; J represents a total moment of inertia on a motor shaft; $C_m$ represents a motor torque coefficient; $C_e$ represents a motor electromotive force coefficient; $R_a$ represents an armature winding resistance; w(s) represents a Laplace transformation of an output angular velocity; $U_a(s)$ represents a Laplace transformation of an input; $G_g(s)$ represents a proportional component of the speed gyro; and $K_{pwm}$ represents a proportional amplification component of the power amplifier.

According to the stability control method based on particle active disturbance rejection of the present disclosure, where the active disturbance rejection controller model is expressed as:

$$\ddot{y} = f(y, \dot{y}, w(k), k) + bu;$$

$$TD: \begin{cases} fh = fhan(x_1(k) - v(k), x_2(k), r, h_0) \\ x_1(k+1) = x_1(k) + hx_2(k) \\ x_2(k+1) = x_2(k) = hfh \end{cases};$$

$$ESO: \begin{cases} e(k) = z_1(k) - y(k) \\ z_1(k+1) = z_1(k) + h(z_2(k) - \beta_{01} e(k)) \\ z_2(k+1) = z_2(k) + h(z_3(k) - \beta_{02} fal(e(k), 0.5, \delta) + bu(k)) \\ z_3(k+1) = z_3(k) - h\beta_{03} fal(e(k), 0.25, \delta) \end{cases};$$

$$NLSEF: \begin{cases} e_1(k) = x_1(k) - z_1(k) \\ e_2(k) = x_2(k) - z_2(k) \\ u_0(k) = fhan(e_1, ce_2, r_1, h_1) \end{cases};$$

$$u(k) = u_0(k) - z_3(k)/b_0;$$

$$fhan(x_1, x_2, r, h) = \begin{cases} d = rh^2 \\ a_0 = hx_2 \\ y = x_1 + a_0 \\ a_1 = \sqrt{d(d + 8|x|)} \\ a_2 = a_0 + \text{sign}(y)(a_1 - d)/2 \\ s_y = [\text{sign}(y+d) - \text{sign}(y-d)]/2 \\ a = (a_0 + y - a_2)s_y + a_2 \\ s_a = [\text{sign}(y+d) - \text{sign}(y-d)]/2 \\ fhan = -r\left[\frac{a}{d} - \text{sign}(a)\right]s_a - r\,\text{sign}(a) \end{cases};$$

$$fal(x, a, d) = \begin{cases} \frac{x}{d^{(1-a)}}, & |x| \le d \\ \text{sign}(x)|x|^a, & |x| > d \end{cases};$$

where $\ddot{y}$ represents a differential equation of a control system of the photoelectric pod; TD represents a tracking differentiator; ESO represents an extended state observer; NLSEF represents a nonlinear state error feedback control law; f(y, ẏ, w(k), k) represents a total disturbance; v(k) represents a system input signal; y is represents an output signal; w(k) represents a total external disturbance; differential signals $v_1(k)$ and $v_2(k)$ are generated by the TD through converting the system input signal v(k); $z_1(k)$, $z_2(k)$, and $z_3(k)$ respectively represent estimators of the differential signals $v_1(k)$ and $v_2(k)$, and the total disturbance f(y, y&, w(t), t); r, h, $h_0$ are parameters of the TD; r represents a fast factor; h represents a system sampling step size; $h_0$ represents a dimensionless parameter, which is an integer multiple of the system sampling step size h; h, $\beta_{01}$, $\beta_{02}$, $\beta_{03}$, $\delta$, b are parameters of the ESO; $\beta_{01}$, $\beta_{02}$, $\beta_{03}$ are coefficient parameters related to the system sampling step size h; $\delta$ represents a meaningless coefficient, which is taken as an integer multiple of the system sampling step size h; b represents a control quantity coefficient and is a time-varying function, which is a constant $b_0$ approximately; c, $r_1$, $h_1$ are parameters of the NLSEF, where c represents a damping factor, $h_1$ represents a fast factor, and $r_1$ represents a control quantity factor; fhan and fal are expressions of nonlinear functions, respectively; u represents a controlled object; $u_0(t)$ represents an error feedback control quantity; a, $a_0$, $a_1$ and $a_2$ are dimensionless intermediate parameters.

According to the stability control method based on particle active disturbance rejection of the present disclosure, where the to-be-optimized parameters of the active disturbance rejection controller model comprises $\beta_{01}$, $\beta_{02}$, $\beta_{03}$, c, $h_1$;

where the optimizing to-be-optimized parameters of the active disturbance rejection controller model using the particle swarm optimization algorithm, includes:

step 1, initializing a particle swarm;

step 2, calculating a fitness value of each particle in the particle swarm according to a fitness function, where each particle corresponds to a combination of the to-be-optimized parameters;

step 3, updating, according to the fitness value of each particle, an individual extreme value of the particle and a global extreme value;

step 4, updating a position and a speed of each particle;

step 5, determining that whether a stop condition is satisfied, outputting an optimal parameter combination, if it is determined that the stop condition is satisfied; returning to and performing the step 2, if it is determined that the stop condition is not satisfied.

In a second aspect, an embodiment of the present disclosure provides a stability control device based on particle active disturbance rejection, which includes:

a first processing unit, configured to establish an active disturbance rejection controller model according to a dynamic model and a speed loop control model of a tethered balloon system, where the speed loop control model is established through theoretical modeling of executive components of a control system of the tethered balloon system; and a second processing unit, configured to optimize to-be-optimized parameters of the active disturbance rejection controller model using a particle swarm optimization algorithm, determine an optimal active disturbance rejection controller model, and use the optimal active disturbance rejection controller model to implement stability control of a photoelectric pod.

In a third aspect, an embodiment of the present disclosure provides an electronic device, which includes: a memory; a processor, and a computer program stored in the memory and executable on the processor, the processor is configured to implement any one of the stability control methods based on particle active disturbance rejection described above upon executing the computer program.

In a fourth aspect, an embodiment of the present disclosure provides a non-transitory computer-readable storage medium with a computer program stored thereon, where the computer program, when executed by a processor, enables any one of the stability control methods based on particle active disturbance rejection described above to be implemented.

The stability control method and device based on the particle active disturbance rejection provided by the present disclosure aim at the problem that a tethered balloon system, as a weakly controlled aircraft, is greatly disturbed by the wind, has poor state stability, and affects the stable imaging of the photoelectric pod, optimize an active disturbance rejection controller by using a particle swarm optimization algorithm, which can effectively isolate the internal and external disturbances of the photoelectric pod and improve the imaging stability of the photoelectric pod. It is of great significance in the application of the aerostats such as the tethered balloon in the fields, for example, long-term air stay, earth observation, monitoring, etc.

BRIEF DESCRIPTION OF THE DRAWINGS

In order to more clearly explain the technical solutions of the present disclosure or the prior art, accompanying drawings required to be used in the description of embodiments or the prior art will briefly introduced hereinafter. It is apparent that the accompanying drawings in the following description are merely some embodiments of the present disclosure. For those of ordinary skill in the art, other drawings can be obtained according to the introduced accompanying drawings without any creative effort.

DETAILED DESCRIPTION OF EMBODIMENTS

Figure 1:
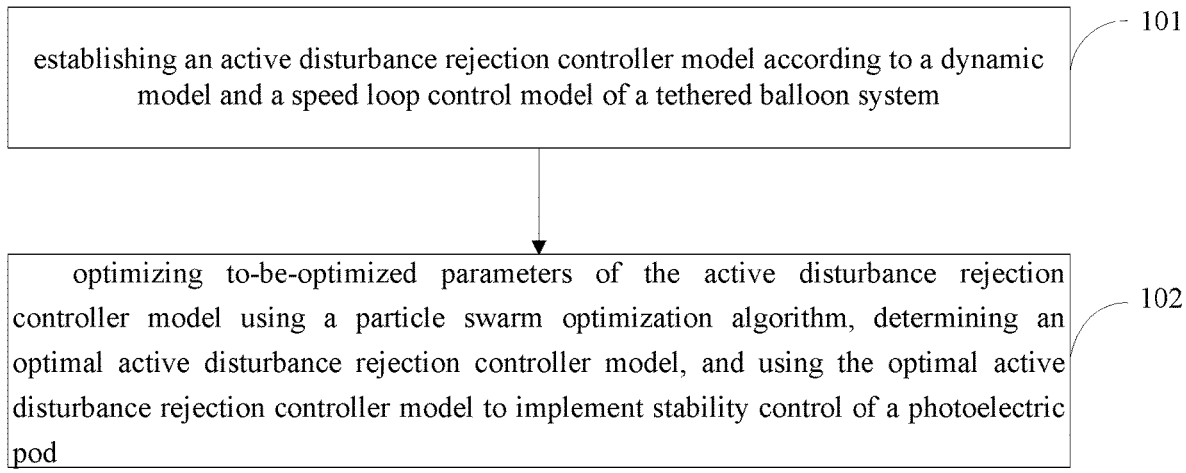
FIG. 1 illustrates a flow chart of a stability control method based on particle active disturbance rejection according to an embodiment of the present disclosure.

In order to make the purpose, the technical solutions and the advantages of the present disclosure clearer, the technical solutions of the present disclosure will be clearly and completely described below with reference to the accompanying drawings. It is apparent that the described embodiments are merely part of embodiments of the present disclosure, but not all of the embodiments of the present disclosure. Based on the described embodiment of the present disclosure, all other embodiments obtained by the skilled in the art without creative labor are within the scope of protection of the present disclosure.

For the above-mentioned difficult problems in the stability control of the photoelectric pod based on the tethered balloon platform, it is necessary to overcome the random influence of the wind on the tethered balloon platform, and to improve the anti-interference ability of the photoelectric pod while ensuring the rapid response of the photoelectric pod, that is to say, the improving of the stability of the photoelectric pod is the key technical problem to be solved at present.

The core idea of the active disturbance rejection control (ADRC) is "active disturbance rejection". The external disturbance of the tethered-balloon-based photoelectric pod system and the uncertainty of the tethered-balloon-based photoelectric pod system model can be estimated as a comprehensive disturbance term through an extended state observer, so that the direct feedforward compensation control of the disturbance can be realized and its influence can be eliminated. The ADRC does not need precise modeling of a controlled object and physical measurement of disturbance terms, and has the characteristics of fast response, high precision, strong disturbance suppression ability and simple algorithm.

In an ADRC model, there are 12 parameters to be determined. After the understanding and empirical values of the ADRC model, five of the 12 parameters are still required to be determined. However, it is difficult to make these five parameters cooperate with each other to achieve the optimal control effect only by empirical values. Therefore, a new optimization algorithm is required to obtain these five parameters.

The particle swarm optimization (PSO) algorithm abstracts, by simulating the process of bird predation, each bird into a particle with no mass or volume, and regards an optimized space as a flight space of birds. An optimal solution is a position of food, so the optimal solution must be near the particle close to the position, and an optimization process is the process of birds looking for the food. In the optimization process, all particles have a fitness value determined by an optimized function, and each particle also has a speed that determines its flying direction and its distance. Then, particles follow a current optimal particle and search in a solution space. Each particle will obtain a best position of its own history and the best position of the particle swarm, and find the best solution through information sharing and cooperation.

The general steps include: initializing the PSO algorithm as a group of random particles (random solutions), and then finding an optimal solution through iterations. In each of the iterations, each particle of the group of random particles updates itself by tracking two "extreme values". One of the two "extreme values" is an optimal solution found by the particle itself, which is called an individual extreme value $P_{best}(i)$, and the other extreme value is an optimal solution found by the whole population, which is called a global extreme value $g_{best}$. In addition, it is also possible to use only neighbors of some best particles instead of the whole population, then the extreme value of the neighbors is a local extreme value.

With respect to the present disclosure, the PSO algorithm is creatively used for optimization of the parameters of the ADRC, which solves the defect that the ADRC model cannot adjust the parameters in real time, effectively isolates the disturbances inside and outside the photoelectric pod, improves the imaging stability of the photoelectric pod, and greatly improves the anti-interference and robustness of the tethered-balloon-based photoelectric pod system.

A stability control method and device based on particle active disturbance rejection provided by embodiments of the present disclosure are described with reference to FIGS. 1 through 10.

FIG. 1 illustrates a flow chart of a stability control method based on particle active disturbance rejection according to an embodiment of the present disclosure. As shown in FIG. 1, the method includes but not limited to steps 101 and 102.

In the step 101, an active disturbance rejection controller model is established according to a dynamic model and a speed loop control model of a tethered balloon system.

Specifically, the speed loop control model is established through theoretical modeling of executive components of a control system of the tethered balloon system.

In particular, the present disclosure mainly establishes the dynamic model of the tethered balloon system according to photoelectric detection task requirements of the tethered balloon system. For the tethered balloon system, since a sphere of a tethered balloon is almost rigidly connected with the photoelectric pod, the motion of the photoelectric pod is basically the same as that of the sphere of the tethered balloon, and the motion of the tethered balloon system is the coupling of the motion of a cable and the motion of the sphere of the tethered balloon, such that the dynamic model of the tethered balloon system consists of a dynamic equation of the cable, a motion equation of the sphere of the tethered balloon, and an initial condition and a boundary condition of the motion equation of the sphere of the tethered balloon.

As an alternative embodiment, the dynamic model of the tethered balloon system consists of: a transient motion equation of the tethered balloon, a boundary condition of an anchor point, a boundary condition of a master node, a steady motion equation of the tethered balloon, and the dynamic equation of the cable.

Figure 2:
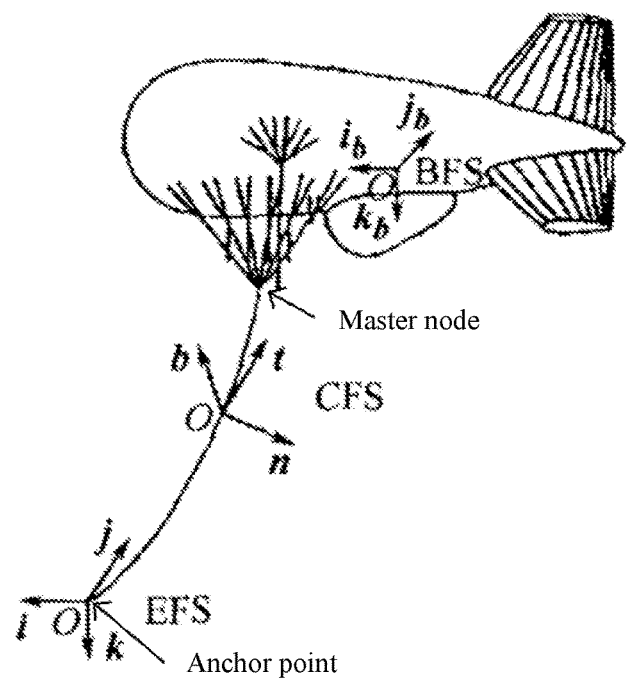
FIG. 2 illustrates a schematic view of a coordinate system of a tethered balloon according to an embodiment of the present disclosure.

FIG. 2 illustrates a schematic view of a coordinate system of the tethered balloon provided by the present disclosure. As shown in FIG. 2, a ground coordinate system of the anchor point (EFS), a body axis system of the tethered balloon (BFS), and a local coordinate system of the cable (CFS) are pre-constructed. A coordinate transformation matrix between the EFS and the BFS is denoted as $L_{be}$, a coordinate transformation matrix between the EFS and the CFS is denoted as $L_{ce}$, an azimuth angle and an inclination angle of the cable are respectively denoted as $\gamma$ and $\beta$, and a yaw angle, a pitch angle and a roll angle of the sphere of the tethered balloon are respectively denoted as $\psi$, $\theta$ and $\phi$.

After the coordinate system of the tethered balloon is determined, a transient motion equation of the cable can be obtained, which is expressed as follows:

$$M\frac{\partial Y}{\partial s} = N\frac{\partial Y}{\partial t} + q;$$

where M, N, and q are respectively expressed as follows:

$$M = \begin{bmatrix} 1 & 0 & 0 & 0 & 0 & 0 \\ 0 & 1 & 0 & 0 & V_n & V_b\cos\beta \\ 0 & 0 & 1 & 0 & -V_t & V_b\sin\beta \\ 0 & 0 & 0 & 1 & 0 & -(V_t\cos\beta + V_n\sin\beta) \\ 0 & 0 & 0 & 0 & -T & 0 \\ 0 & 0 & 0 & 0 & 0 & -T\cos\beta \end{bmatrix},$$

-continued $$N = \begin{bmatrix} -\dfrac{emV_t}{1+eT} & m & 0 & 0 & mV_n+\rho A(V_n-J_n) & \cos\beta(mV_b+\rho A(V_b-J_b)) \\ e & 0 & 0 & 0 & 0 & 0 \\ 0 & 0 & 0 & 0 & -1(1+eT) & 0 \\ 0 & 0 & 0 & 0 & 0 & -\cos\beta(1+eT) \\ -\dfrac{em[V_n+\rho A(V_n-J_n)]}{1+eT} & 0 & m+\rho A & 0 & -mV_t & \sin\beta[mV_b+\rho A(V_b-J_b)] \\ -\dfrac{em[V_n+\rho A(V_b-J_b)]}{1+eT} & 0 & 0 & m+\rho A & 0 & -mV_t\cos\beta-\sin\beta[mV_b+\rho A(V_n-J_n)] \end{bmatrix},$$

and $$q = [W\sin\beta - F_d t, 0, 0, 0, -W\cos\beta - F_d n - \rho A j_n, -F_d b - \rho A j_b)]^T;$$

specifically, M and N represent intermediate result matrices; q represents a force matrix; Y represents a state matrix $[T\ V_t\ V_n\ V_b\ \beta\ \gamma]^T$ of the cable, where $\beta$ represents the inclination angle of the cable, $\gamma$ represents the azimuth angle of the cable, $V_n$, $V_b$, and $V_t$ respectively represent components of a speed of the cable in the CFS; $F_t$, $F_n$, $F_b$ respectively represent components of a sum of an inertia force and an aerodynamic force of the cable in the CFS; m represents a mass of the cable; $\rho$ represents an air density; u represents an air speed of the cable; $J_t$, $J_n$, $J_b$ respectively represent components of a wind speed J in the CFS; e=1/EA, where E represents an elasticity modulus of the cable, and A represents an area of the cable before deformation; T represents a tension borne by the cable; W represents a gravity.

Based on the above, the transient motion equation of the tethered balloon is expressed as a formula (1):

$$M_1 \dot{V} + C_{RB} V = \tau_{RB} \quad (1)$$

$$M_1 = \begin{bmatrix} 1.1m & & & & & \\ & 1.81m & & & & \\ & & 1.81m & & & \\ & & & 1.03 I_{xx} & & -I_{zx} \\ & & & & 1.49 I_{yy} & \\ & & & -I_{zx} & & 1.49 I_{zz} \end{bmatrix},$$

where $M_1$ represents a mass matrix, is m represents a mass of the sphere of the tethered balloon, moments of inertia $I_{xx}$, $I_{yy}$, $I_{zz}$ and an inertia product $I_{zx}$ are moments of inertia corresponding to a center of gravity of the sphere of the tethered balloon being in the BFS; $\tau_{RB}$ represents a projection of the sum of the inertia force and the aerodynamic force of the cable in the body axis system BFS of the tethered balloon; V represents a speed of the sphere of the tethered balloon in the body axis system BFS of the tethered balloon; $\dot{V}$ is a derivative of V and represents an acceleration of the sphere of the tethered balloon; and $C_{RB}$ represents a dynamic moment of rotation.

An initial condition of the transient motion equation of the tethered balloon can include an intention of the cable, the inclination angle and the azimuth angle of the cable, and the yaw angle, the pitch angle and the roll angle of the sphere of the tethered balloon at a steady state.

Further, the boundary condition of the anchor point may be expressed as a formula (2):

$$[V_{x0}\ V_{y0}\ V_{z0}]^T = (L_{ce})^T [V_{t0}\ V_{n0}\ V_{b0}]^T \quad (2),$$

where $[V_{t0}\ V_{n0}\ V_{b0}]^T$ represents a speed of the cable in the CFS; $[V_{x0}\ V_{y0}\ V_{z0}]^T$ represents a speed of the anchor point in the EFS; and $L_{ce}$ represents the coordinate transformation matrix between the EFS and the CFS.

Further, the master node refers to a main connection point between the cable and the sphere of the tethered balloon, and the boundary condition of the master node satisfies the speed continuity condition, and can be determined as a formula (3):

$$L_{ce}[V_{tN}\ V_{nN}\ V_{bN}]^T = V_B + \omega \times R_B \quad (3),$$

where the cable is divided into N sections from the anchor point to the main node, n represents the n-th node, $[V_{tN}\ V_{nN}\ V_{bN}]^T$ represents a speed of the n-th node in the CFS; $R_B$ represents a vector of a node B in the BFS; $V_B$ represents a speed of the node B in BFS; and $\omega$ represents a motor angular velocity of a rotating shaft of the photoelectric pod.

Further, the steady motion equation of the tethered balloon may be expressed as a formula (4)

$$\begin{bmatrix} p \\ q \\ r \end{bmatrix} = \begin{bmatrix} 1 & 0 & -\sin\theta \\ 0 & \cos\phi & \sin\phi\cos\theta \\ 0 & -\sin\phi & \cos\phi\cos\theta \end{bmatrix} \begin{bmatrix} \dot{\phi} \\ \dot{\theta} \\ \dot{\psi} \end{bmatrix}, \quad (4)$$

where [p, q, r] respectively represents rotational angular velocities of the tethered balloon in the body axis system BFS, and $\psi$, $\theta$, $\phi$ represents the yaw angle, the pitch angle and the roll angle of the sphere of the tethered balloon, respectively.

Finally, a coupling equation is established based on a difference method, and thus the dynamic equation of the cable can be obtained, which is expressed as a formula (5):

$$M_{j+1/2}^i (Y_{j+1}^i - Y_j^i)/\Delta S + M_{j+1/2}^{i+1}(Y_{j+1}^{i+1} - Y_j^{i+1})/\Delta S = \quad (5)$$

$$N_j^{i+1/2}(Y_j^{i+1} - Y_j^i)/\Delta t + N_{j+1}^{i+1/2}(Y_{j+1}^{i+1} - Y_{j+1}^i)/\Delta t + q_{j+1/2}^i + q_{j+1/2}^{i+1}$$

$$Y_{j+1/2} = \frac{1}{2}(Y_j + Y_{j+1}),$$

where M and N represent intermediate result matrices; q represents a force matrix; Y represents a state matrix $[T\ V_t\ V_n\ V_b\ \beta\ \gamma]^T$ of the cable, where $\beta$ represents the azimuth angle of the cable, $\gamma$ represents the inclination angle of the cable, $V_n$, $V_b$, and $V_t$ respectively represent components of a speed of the cable in the local coordinate system CFS; $M_j^i$, $N_j^i$, $q_j^i$, and $Y_j^i$ are corresponding values in a moment i and at a position j; $\Delta S$ represents a micro segmentation of the cable; and $\Delta t$ represents a micro segmentation of time.

By combining the above formulas (1) through (5), the dynamic model of the tethered balloon system can be established. By solving the dynamic model of the tethered balloon system, relevant parameters such as the speed of the cable, the speed of the sphere of the tethered balloon and the inclination angle of the cable can be determined, and a working state of the photoelectric pod can be further determined by analyzing the relevant parameters.

Furthermore, executive components of the control system of the tethered balloon system are theoretically modeled, to establish the speed loop control model.

Specifically, the speed loop control model constructed in the present disclosure mainly includes, but is not limited to, a motor transfer function of the rotating shaft of the photoelectric pod, a transfer function of a speed gyro, and a transfer function of a power amplifier.

Because each of rotating shafts of the photoelectric pod is controlled by a separate motor, the control principles and control methods of the rotating shafts are the same, the motor is generally a direct current (DC) torque motor. To control a pointing direction of a photoelectric sensor, it is necessary to make the motors of all of the rotating shafts of the photoelectric pod rotate at a certain angle.

The stability of the control system of the photoelectric pod is essentially to ensure that the photoelectric pod can control the rotation of the motor corresponding to each rotating shaft to compensate in real time under the condition of internal and external disturbance, so as to weaken or eliminate the internal and external disturbance, and make the pointing of the photoelectric sensor remain stable without shake and deviation.

Figure 3:
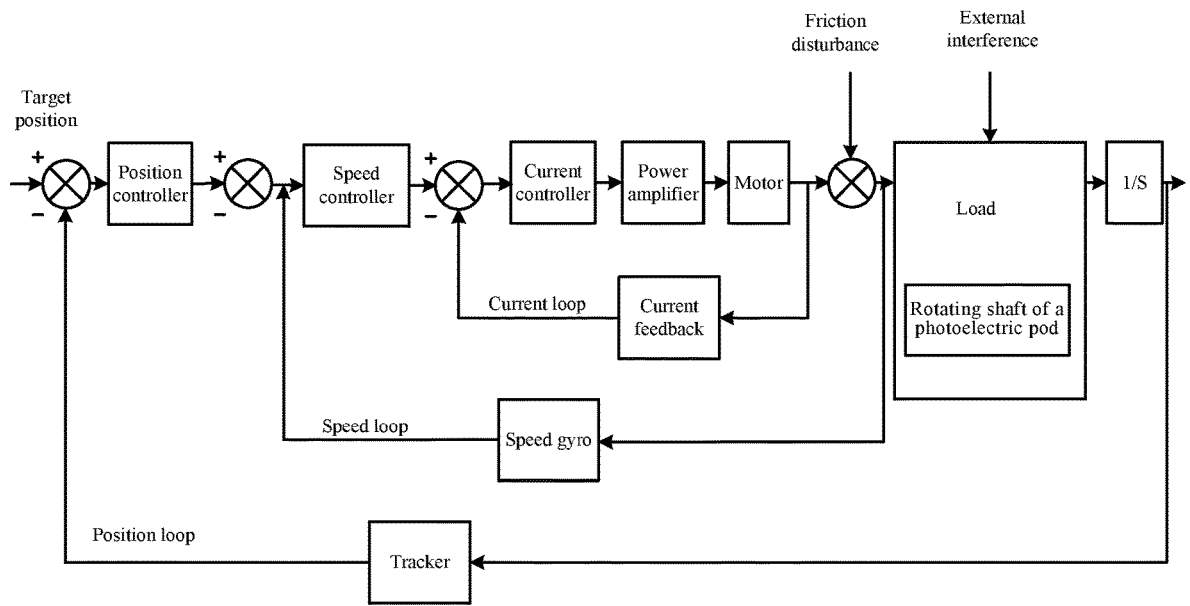
FIG. 3 illustrates a schematic view of a control principle of a single shaft motor according to an embodiment of the present disclosure.

FIG. 3 illustrates a schematic view of a control principle of a single shaft motor according to an embodiment of the present disclosure. As shown in FIG. 3, the single shaft motor is usually controlled by three closed-loop control loops: a position loop, a speed loop and a current loop, which correspond respectively to a position controller, a speed controller and a current controller.

Specifically, the current loop is the innermost loop and is used to control the shaft motor to output a stable torque, so that a current is not easy to fluctuate and produce sudden change. The speed loop is the middle loop, and is used to restrain the interference of a load and a friction moment inside the photoelectric pod, and to realize the pointing stability, and respond quickly of the sensor. The position loop is the outermost loop, and is used to mainly measure and feedback a position signal, so that the pointing of the sensor changes with the movement of a target, however, the position loop can only isolate a low-frequency disturbance.

Figure 4:
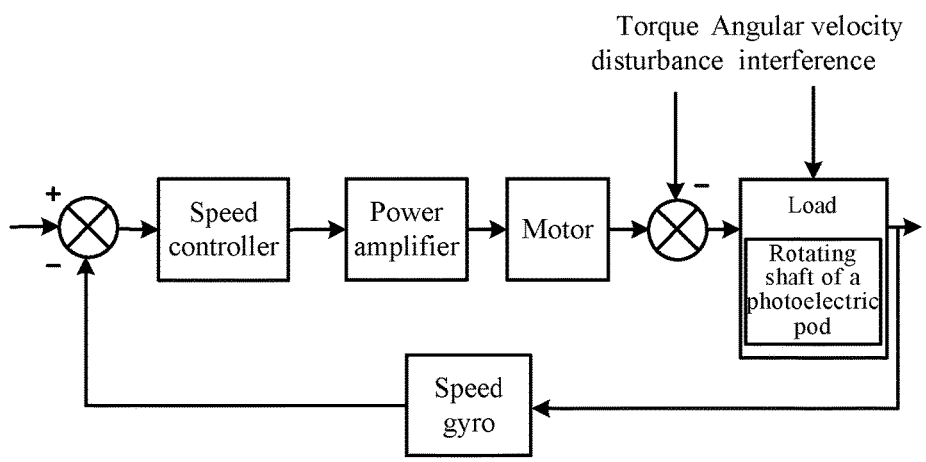
FIG. 4 illustrates a schematic view of a control structure of a speed stabilization loop according to an embodiment of the present disclosure.

FIG. 4 illustrates a schematic view of a control structure of a speed stabilization loop according to an embodiment of the present disclosure. As shown in FIG. 4, the key to realize the stability control of the photoelectric pod is to design and control the speed loop, to ensure that the speed loop is less affected by the current loop and the position loop.

In view of this, the stability control method based on particle active disturbance rejection is provided, which uses the control principle of the single shaft motor, comprehensively considers internal and external interference factors that affect the speed, theoretically models executive components of the control system of the tethered balloon system, determines the motor transfer function of the rotating shaft of the photoelectric pod, the transfer function of the speed gyro, and the transfer function of the power amplifier, and thereby to determine the speed loop control model.

The executive components of the control system of the tethered balloon system mainly include: a DC torque motor and a load (mainly including the rotating shafts of photoelectric pod and other components connected to the rotating shafts), a pulse-width modulation (PWM) power amplifier, and a speed gyro.

Optionally, the motor transfer function may be expressed as a formula (6):

$$G'(s) = \frac{w(s)}{U_a(s)} = \frac{C_m}{JL_a s^2 + JR_a s + C_e C_m}, \quad (6)$$

where $L_a$ represents an armature winding inductance; J represents a total moment of inertia on a motor shaft; $C_m$ represents a motor torque coefficient, and $C_e$ represents a motor electromotive force coefficient; $R_a$ represents an armature winding resistance; w(s) represents a Laplace transformation of an output angular velocity, and $U_a(s)$ represents a Laplace transformation of an input.

Furthermore, when a bandwidth of the speed gyro is wide, a mathematical model of the speed gyro can be regarded as a proportional component, which is expressed as a formula (7):

$$G''(s) = G_g(s) = k_g \quad (7).$$

Further, a mathematical model of the power amplifier can be simplified as a proportional amplification component, which is expressed as a formula (8):

$$G'''(s) = K_{pwm} \quad (8).$$

Figure 5:
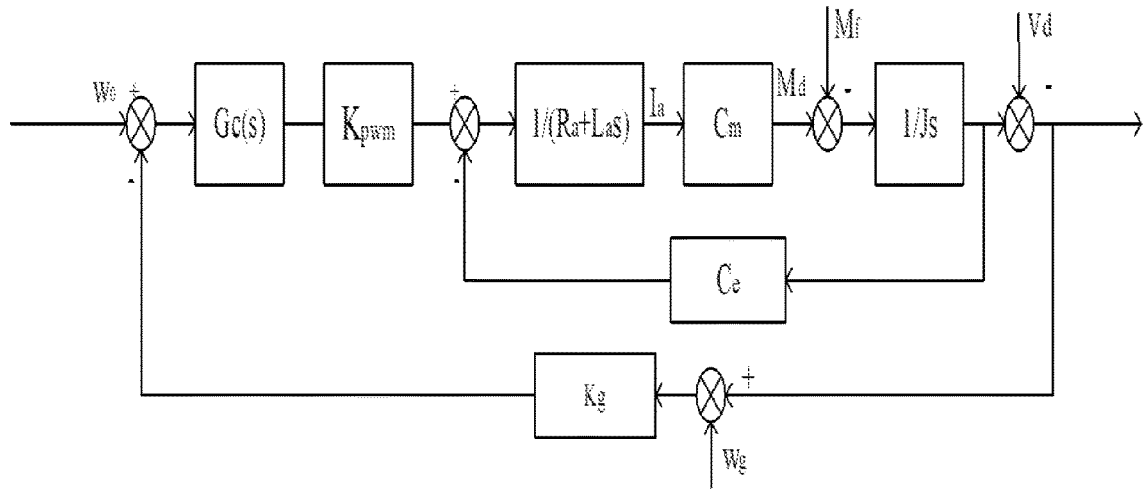
FIG. 5 illustrates a schematic view of a control model of the speed stabilization loop according to an embodiment of the present disclosure.

FIG. 5 illustrates a schematic view of a control model of a speed stabilization loop according to an embodiment of the present disclosure. As shown in FIG. 5, the speed loop control model can be constructed by combining the above formulas (6) through (8).

Further, the ADRC model can be established based on the dynamic model of the tethered balloon system and the speed loop control model.

The ADRC mainly include a tracking differentiator TD, a nonlinear state error feedback control law NLSEF and an extended state observer ESO. A differential equation of the control system of photoelectric pod can be expressed by a conventional second-order differential equation, which is expressed as a formula (9):

$$\ddot{y} = f(y, \dot{y}, w(k), k) + bu \quad (9),$$

where w(k) represents a total external disturbance; f(y, ẏ, w(t), t) represents a total disturbance including an internal disturbance (such as a friction torque, a gyro noise) and an external disturbances (such as the movement of the tethered balloon); u represents inputs of controlled objects (the controlled objects include the whole components as shown in FIG. 3, mainly including the motor and the load); and b represents a control quantity coefficient, which can take a constant value $b_0$.

Figure 6:
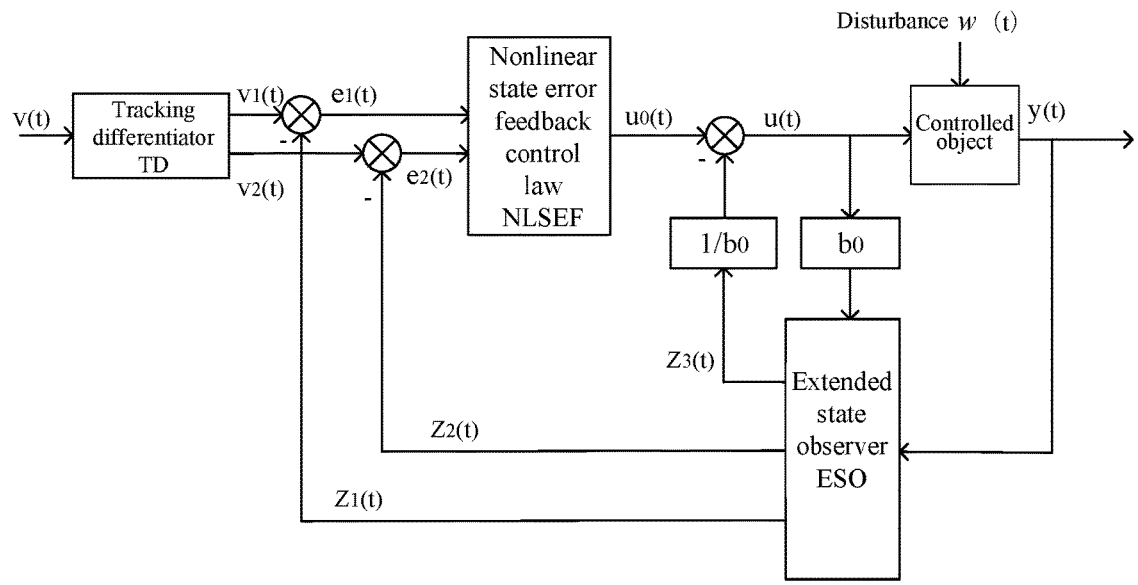
FIG. 6 illustrates a schematic view of a second-order active disturbance rejection controller according to an embodiment of the present disclosure.

FIG. 6 illustrates a schematic view of a second-order active disturbance rejection controller according to an embodiment of the present disclosure. As shown in FIG. 6, v(t) represents a system input signal, which is equivalent to an angular velocity signal required to be output by the motor.

The tracking differentiator converts the system input signal v(t) into equivalent differential signals $v_1(t)$ and $v_2(t)$ (see an expression of the tracking differentiator). $u_0(t)$ is obtained by nonlinear combination of $e_1(t)$ and $e_2(t)$. $z_1(t)$, $z_2(t)$, and $z_3(t)$ respectively represent estimators of $v_1(t)$, $v_2(t)$ and the total disturbance f(y, ẏ, w(t), t).

When designing the ADRC and optimizing parameters of the ADRC, it is necessary to perform algorithm discretization, and thus the tracking differentiator TD, the nonlinear state error feedback control law NLSEF and the extended state observer ESO are expressed as formulas (11) through (13), respectively:

$$TD : \begin{cases} fh = fhan(x_1(k) - v(k), x_2(k), r, h_0) \\ x_1(k+1) = x_1(k) + hx_2(k) \\ x_2(k+1) = x_2(k) = hfh \end{cases} \quad (10)$$

$$ESO : \begin{cases} e(k) = z_1(k) - y(k) \\ z_1(k+1) = z_1(k) + h(z_2(k) - \beta_{01}e(k)) \\ z_2(k+1) = z_2(k) + h(z_3(k) - \beta_{02}fal(e(k), 0.5, \delta) + bu(k)) \\ z_3(k+1) = z_3(k) - h\beta_{03}fal(e(k), 0.25, \delta) \end{cases} \quad (11)$$

$$NLSEF : \begin{cases} e_1(k) = x_1(k) - z_1(k) \\ e_2(k) = x_2(k) - z_2(k) \\ u_0(k) = fhan(e_1, ce_2, r_1, h_1) \end{cases} \quad (12)$$

where $u(k) = u_0(k) - z_3(k)/b_0$ (13), and the two nonlinear functions fhan and fal (similar to linear combination in a PID control, both of which are feedback control rates) are respectively expressed as formulas (14) and (15):

$$fhan(x_1, x_2, r, h) = \begin{cases} d = rh^2 \\ a_0 = hx_2 \\ y = x_1 + a_0 \\ a_1 = \sqrt{d(d+8|y|)} \\ a_2 = a_0 + \text{sign}(y)(a_1 - d)/2 \\ s_y = [\text{sign}(y+d) - \text{sign}(y-d)]/2 \\ a = (a_0 + y - a_2)s_y + a_2 \\ s_a = [\text{sign}(y+d) - \text{sign}(y-d)]/2 \\ fhan = -r\left[\frac{a}{d} - \text{sign}(a)\right]s_a - r\text{sign}(a) \end{cases} \text{, and} \quad (14)$$

$$fal(x, a, d) = \begin{cases} \frac{x}{d^{(1-a)}}, |x| \leq d \\ \text{sign}(x)|x|^a, |x| > d \end{cases} \quad (15)$$

In addition, the ADRC has further a disturbance compensation process.

The above formulas (9) through (15) are combined, to establish the ADRC model, which has 12 parameters. The tracking differentiator TD has parameters r, h, $h_0$. The extended state observer ESO has parameters h, $\beta_{01}$, $\beta_{02}$, $\beta_{03}$, $\delta$, b. The nonlinear state error feedback control law NLSEF has parameters C, $r_1$, $h_1$.

Specifically, r represents a fast factor, the bigger the fast factor is, the faster the response is; h represents a system sampling step size; $h_0$ represents a parameter, which has no physical significance and can generally be taken as an integer multiple of the system sampling step size h; $\delta$ represents a meaningless coefficient, and can also be taken as an integer multiple of the system sampling step size h; the control quantity coefficient b is a time-varying function, which can be approximated as the constant value $b_0$; $\beta_{01}$, $\beta_{02}$, $\beta_{03}$ are coefficient parameters related to the system sampling step size h, have no physical significance, and are merely coefficient parameters; where c represents a damping factor; $h_1$ represents a fast factor; $r_1$ represents a control quantity factor. Therefore, it can be determined that five parameters $\beta_{01}$, $\beta_{02}$, $\beta_{03}$, c, $h_1$ need to be optimized.

In the step 102, parameters of the active disturbance rejection controller model model are optimized using the PSO algorithm, an optimal active disturbance rejection controller model model is determined, and the optimal active disturbance rejection controller model model is used to implement the stability control of the photoelectric pod.

Figure 7:
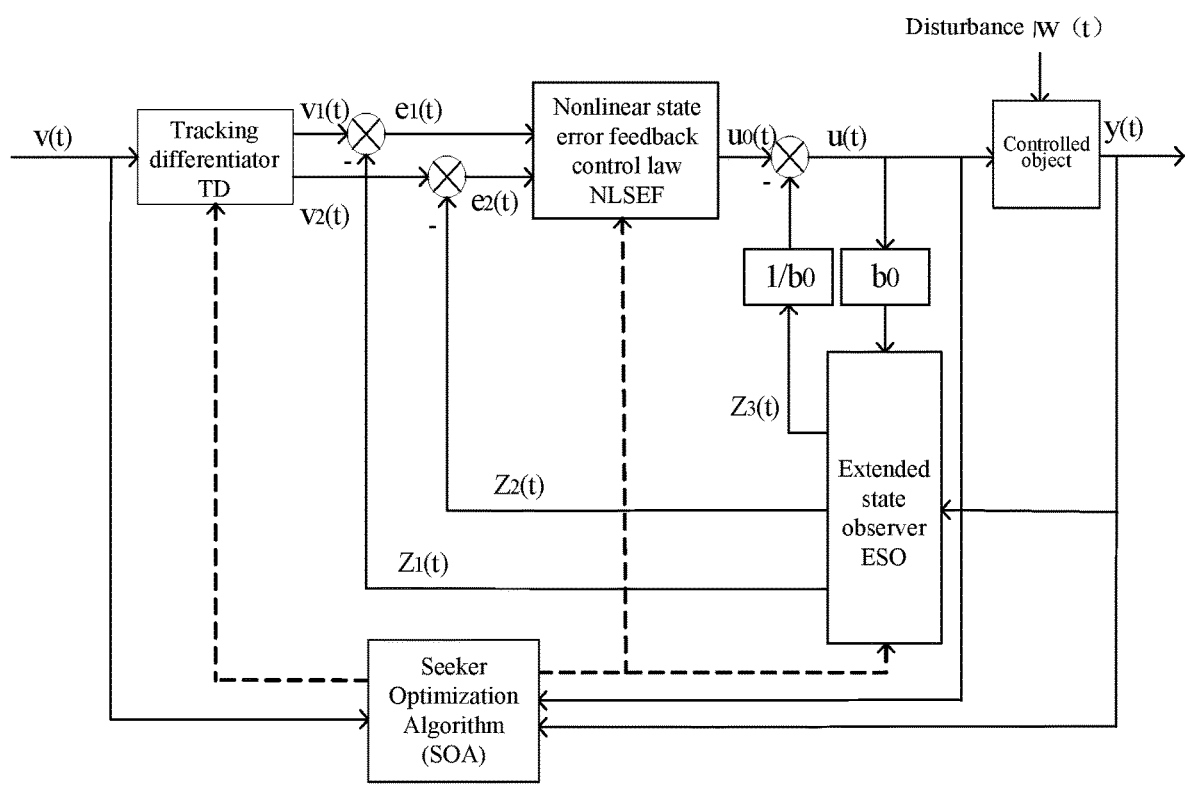
FIG. 7 illustrates a schematic view of a principle of optimizing of parameters of an active disturbance rejection controller by a particle swarm optimization algorithm according to an embodiment of the present disclosure.

FIG. 7 illustrates a schematic view of a principle of optimizing of parameters of an active disturbance rejection controller by a particle swarm optimization algorithm according to an embodiment of the present disclosure. As shown in FIG. 7, the present disclosure adopts the particle swarm optimization algorithm to optimize the above five parameters $\beta_{01}$, $\beta_{02}$, $\beta_{03}$, c, $h_1$, to obtain the optimal ADRC model.

Figure 8:
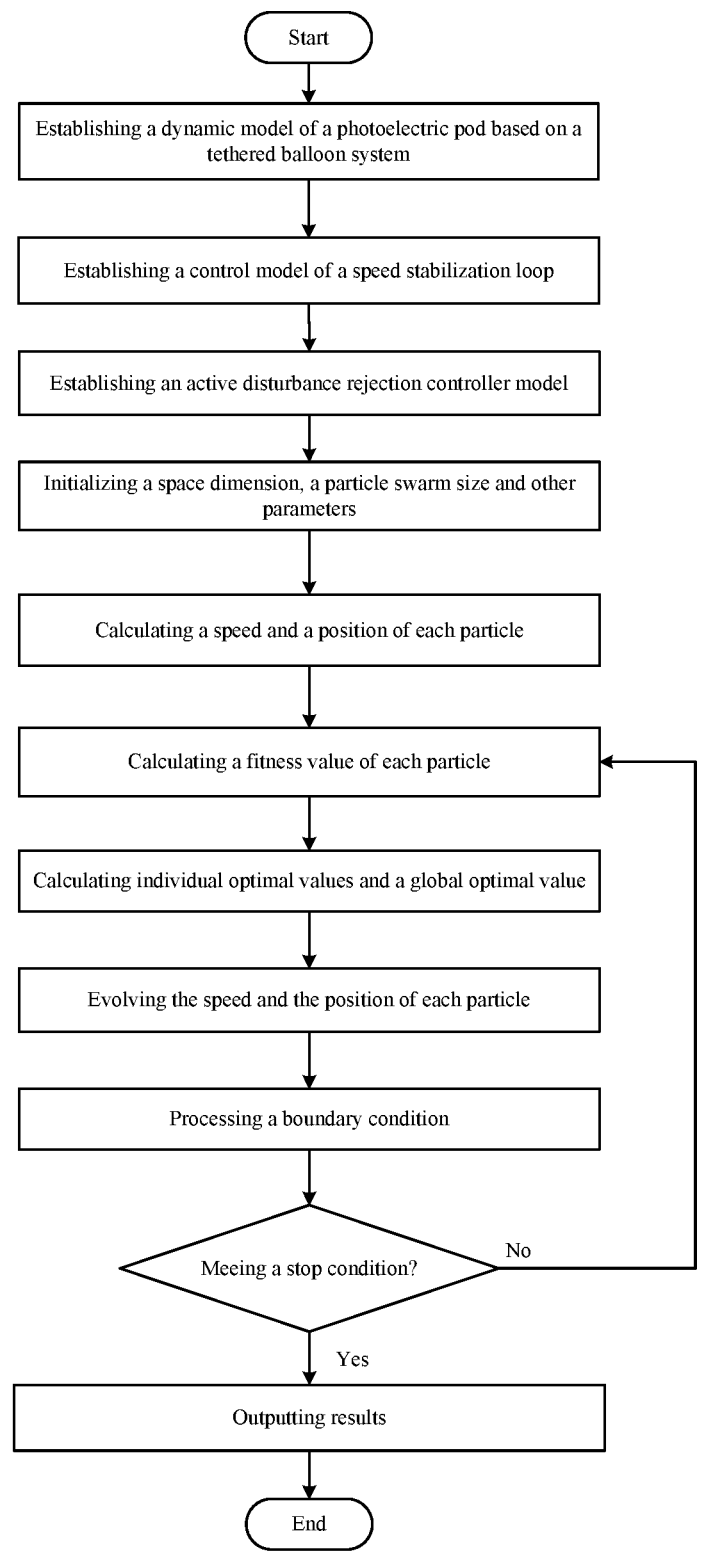
FIG. 8 illustrates a flow chart of the particle swarm optimization algorithm according to an embodiment of the present disclosure.

FIG. 8 illustrates a flow chart of the particle swarm optimization algorithm according to an embodiment of the present disclosure. As shown in FIG. 8, in this embodiment, how to build the ADRC model will not be repeated, but only how to optimize the above five parameters by using the particle swarm optimization algorithm after obtaining the ADRC model is described. The specific steps include, but are not limited to following steps 1 to 5.

In the step 1, a particle swarm is initialized.

In the step 2, a fitness value of each particle in the particle swarm is calculated according to a fitness function, and each particle corresponds to a combination of the parameters to be optimized.

In the step 3, an individual extreme value of each particle and the global extreme value are updated according to the fitness value of the particle.

In the step 4, a position and a speed of each particle are updated.

In the step 5, whether a stop condition is satisfied is determined, if it is determined that the stop condition is satisfied, an optimal parameter combination is output; if it is determined that the stop condition is not satisfied, the step 2 is performed.

The specific implementation of the initialization of the particle swarm proposed in the step 1 may include, but is not limited to: initializing a search space dimension D, a particle swarm size N, acceleration constants $c_1$ and $c_2$, random numbers $r_1$ and $r_2$, a maximum inertia weight $w_{max}$ and a minimum inertia weight $w_{min}$. Further, a position $x_i$, a speed $v_i$, an individual extreme value $P_{best}(i)$ of each particle and the global extreme value $g_{best}$ may be initialized.

Furthermore, the fitness function determines a direction of a solution of each particle, and makes the parameters evolve to an optimal solution of the particle. The present disclosure comprehensively considers the response rapidity, overshoot and control energy, and adopts the following fitness function to realize the calculation of the fitness value of each particle proposed in the step 2, which is expressed as a formula (16):

$$\begin{cases} \text{If } \Delta e(t) < 0 \\ Q = \int_0^T [c_1 t|e(t)| + c_2 u(t)^2 + 100|\Delta e(t)|]dt \end{cases} \quad (16)$$

where e(t) represents a deviation between a given value and an output; $\Delta e(t)$ represents a difference between two adjacent step outputs; $c_1$ represents a weight of the deviation in the fitness function, and $c_2$ represents a weight of a square term of a control quantity in the fitness function, which can be taken $c_1=0.02$, $c_2=0.98$, respectively. u(t) represents the control quantity; and Q represents an objective function value (i.e. the fitness value).

Further, updating the individual extreme value of each particle and the global extreme value according to the fitness value of the particle proposed in the step 3 includes but is not limited to the following steps: comparing the fitness value fit[i] of the particle with the individual extreme value $P_{best}(i)$ of the particle, if fit[i]<$P_{best}(i)$ replacing $P_{best}(i)$ with fit[i]; comparing the fitness value of the particle fit[i] with the global extreme value $g_{best}$, If fit[i]<$g_{best}$, replacing $g_{best}$ with fit[i].

Further, the updating of the position and the speed of each particle proposed in the step 4 includes but is not limited to the following steps: when the individual extreme value $P_{best}(i)$ of each particle and the global extreme value are $g_{best}$ are determined, the particle updates its own speed and position according to a formula (17) with its weight:

$$\begin{cases} v_{ij}(t+1) = w \cdot v_{ij}(t) + c_1 r_1(t)[p_{ij}(t) - x_{ij}(t)] + c_2 r_2(t)[p_{gj}(t) - x_{ij}(t)] \\ x_{ij}(t+1) = x_{ij}(t) + v_{ij}(t+1) \end{cases} \quad (17)$$

where $c_1$ and $c_2$ represent learning factors, which are also called acceleration constants, which indicates a weight of each particle moving to the individual extreme value and the global extreme value in each iteration; $r_1$ and $r_2$ represent random numbers in a range of [0,1], which increase the randomness of each particle moving to an individual optimal position and a group optimal position. w represents a weight factor, the greater the weight factor w is, the greater global search ability is and the smaller local search ability is; the smaller the weight factor w is, the smaller the global search ability is and the greater the local search ability is.

In the optimization process, the weight factor W can be dynamically adjusted to balance the global search ability and the local search ability, and an adjustment manner is expressed as a formula (18):

$$w = w_{max} - \frac{(w_{max} - w_{min}) \cdot t}{T_{max}}, \quad (18)$$

where $T_{max}$ represents a maximum iteration number, $w_{max}$ and $w_{min}$ represent the maximum inertia weight and the minimum inertia weight respectively, and t represents a current iteration number.

Further, in the step 5, it is determined whether the stop condition is satisfied, if so, the particle swarm optimization algorithm ends and the optimization result is output; otherwise, the step 2 is performed.

Specifically, the stop condition may be that a maximum cycle number is reached or the fitness value is smaller than a minimum fitness value.

The stability control method based on the particle active disturbance rejection provided by the present disclosure aims at the problem that a tethered balloon system, as a weakly controlled aircraft, is greatly disturbed by the wind, has poor state stability, and affects the stable imaging of the photoelectric pod, optimizes an active disturbance rejection controller by using a particle swarm optimization algorithm, which can effectively isolate the internal and external disturbances of the photoelectric pod and improve the imaging stability of the photoelectric pod. It is of great significance in the application of the aerostats such as the tethered balloon in the fields, for example, long-term air stay, earth observation, monitoring, etc.

Figure 9:
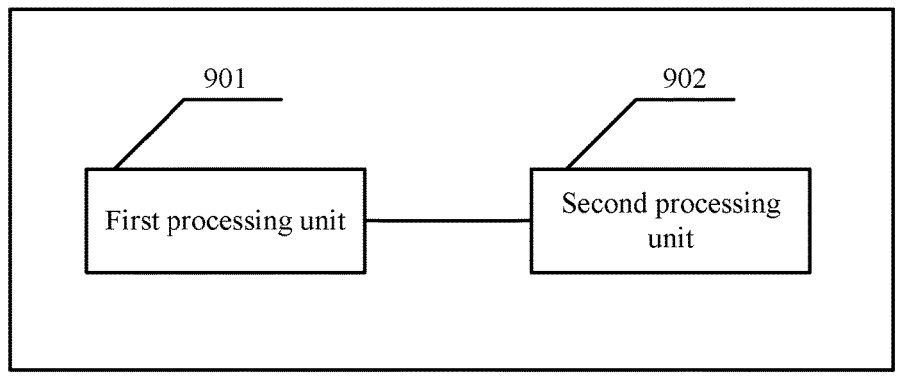
FIG. 9 illustrates a schematic structural view of a stability control device based on particle active disturbance rejection according to an embodiment of the present disclosure.

FIG. 9 illustrates a schematic structural view of a stability control device based on particle active disturbance rejection according to an embodiment of the present disclosure. As shown in FIG. 9, which mainly includes a first processing unit 901 and a second processing unit 902.

The first processing unit 901 is mainly used to establish an ADRC model based on a dynamic model and a speed loop control model of a tethered balloon system.

Specifically, the speed loop control model is established through theoretical modeling of executive components of a control system of the tethered balloon system.

The second processing unit 902 is mainly used to optimize parameters of the ADRC model using the PSO algorithm, and determine an optimal ADRC model, and use the optimal ADRC model to implement the stability control of the photoelectric pod.

It should be noted that the stability control device based on particle active disturbance rejection provided by embodiments of the present disclosure can implement the stability control method based on particle active disturbance rejection described in any of the above embodiments during specific operation, which will be not repeated herein.

The stability control device based on the particle active disturbance rejection provided by the present disclosure aims at the problem that a tethered balloon system, as a weakly controlled aircraft, is greatly disturbed by the wind, has poor state stability, and affects the stable imaging of the photoelectric pod, optimizes an active disturbance rejection controller by using a particle swarm optimization algorithm, which can effectively isolate the internal and external disturbances of the photoelectric pod and improve the imaging stability of the photoelectric pod. It is of great significance in the application of the aerostats such as the tethered balloon in the fields, for example, long-term air stay, earth observation, monitoring, etc.

Figure 10:
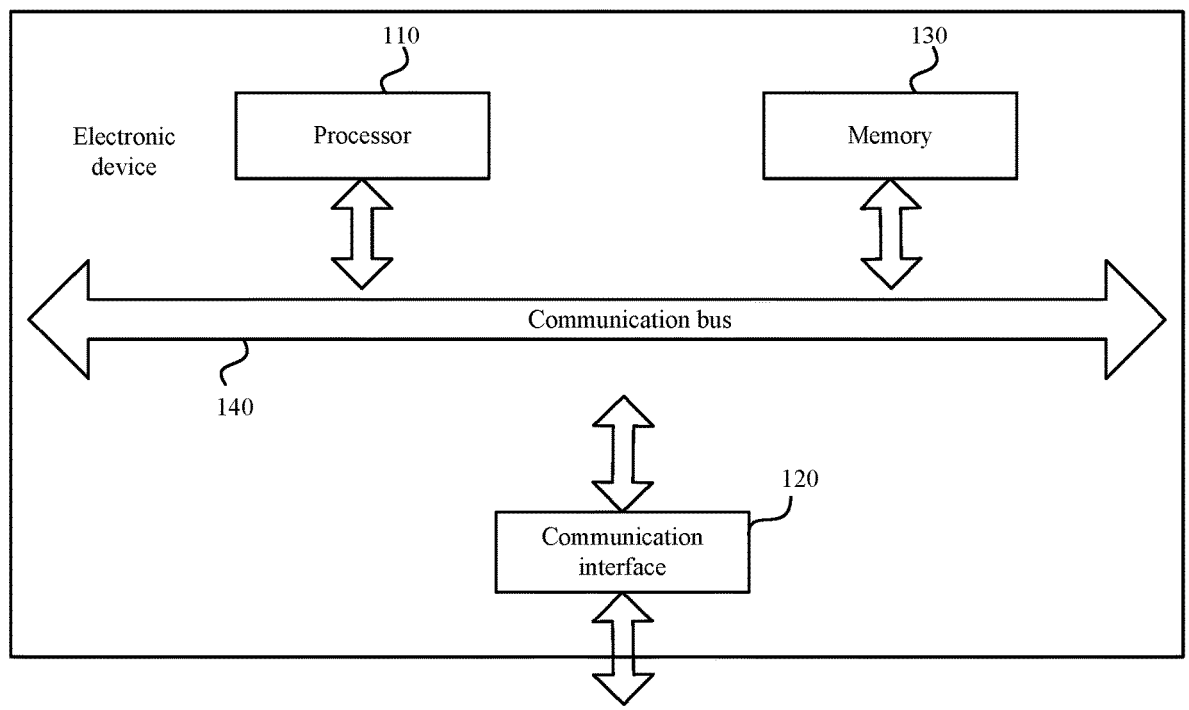
FIG. 10 illustrates a schematic structural view of an electronic device according to an embodiment of the present disclosure.

FIG. 10 illustrates a schematic structural view of an electronic device according to an embodiment of the present disclosure. As shown in FIG. 10, the electronic device may include a processor 110, a communications interface 120, a memory 130, and a communication bus 140. The processor 110, the communications interface 120 and the memory 130 communicate with each other through the communication bus 140. The processor 110 can call logic instructions in the memory 130 to execute the stability control method based on particle active disturbance rejection, which includes: establishing an ADRC model based on a dynamic model and a speed loop control model of a tethered balloon system, where the speed loop control model is established through theoretical modeling of executive components of a control system of the tethered balloon system; and optimizing parameters of the ADRC model using PSO algorithm, determining an optimal ADRC model, and using the optimal ADRC model to implement the stability control of the photoelectric pod.

In addition, the above-mentioned logic instructions in the memory 130 can be implemented in the form of software functional units, and can be stored in a computer-readable storage medium when sold or used as an independent product. Based on this understanding, the part of the technical solutions of the present disclosure that essentially contributes to the prior art or a part of the technical solutions can be embodied in the form of a software product, which is stored in a storage medium and includes a number of instructions to make a computer device (which can be a personal computer, a server, or a network device, etc.) perform all or part of the steps of the methods described in various embodiments of the present disclosure. The aforementioned storage medium include: a U disk, a mobile hard disk, a read-only memory (ROM), a random access memory (RAM), a magnetic disk or an optical disk and other media that can store program codes.

On the other hand, the present disclosure also provides a computer program product, which includes a computer program stored on a non-transitory computer readable storage medium, and the computer program includes program instructions, and when the program instructions are executed by a computer, the computer can implement the stability control method based on particle active disturbance rejection provided by the above method embodiments, which includes: establishing an ADRC model based on a dynamic model and a speed loop control model of a tethered balloon system, where the speed loop control model is established through theoretical modeling of executive components of a control system of the tethered balloon system; and optimizing parameters of the ADRC model using the PSO algorithm, and determining an optimal ADRC model, and using the optimal ADRC model to implement the stability control of the photoelectric pod.

On the other hand, the present disclosure also provides a non-transitory computer-readable storage medium, on which a computer program is stored, which is implemented when executed by a processor to implement the stability control method based on particle active disturbance rejection provided in the above embodiments. The method includes: establishing an ADRC model based on a dynamic model and a speed loop control model of a tethered balloon system, where the speed loop control model is established through theoretical modeling of executive components of a control system of the tethered balloon system; and optimizing parameters of the ADRC model using the PSO algorithm, and determining an optimal ADRC model, and using the optimal ADRC model to implement the stability control of the photoelectric pod.

The above-described device embodiments are merely schematic, in which the units described as separate components may or may not be physically separated, and the components displayed as units may or may not be physical units, that is, they may be located in one place or distributed over multiple network units. Some or all of the modules can be selected according to the actual needs to achieve the purpose of the embodiments. People of ordinary skill in this field can understand and implement it without any creative labor.

From the above description of the embodiments, those skilled in the art can clearly understand that each embodiment can be implemented by means of software plus a necessary general-purpose hardware platform. Of course, each embodiment can also be implemented by hardware. Based on this, the essential or contribution part of the above technical solutions to the prior art can be embodied in the form of a software product, which can be stored in a computer-readable storage medium, such as a ROM/RAM, a magnetic disk, and an optical disk, and includes several instructions to make a computer device (which can be a personal computer, a server, or a network device, etc.) execute the methods described in various embodiments or some parts of embodiments.

Finally, it should be explained that the above embodiments are merely used to illustrate the technical scheme of the present disclosure, but are not intended to limit thereto. Although the present disclosure has been described in detail with reference to the foregoing embodiments, it should be understood by those skilled in the art that it is still possible to modify the technical solutions described in the foregoing embodiments, or to equivalently substitute some technical features thereof. These modifications or substitutions do not make the essence of the corresponding technical solutions deviate from the spirit and scope of the technical solutions of various embodiments of the present disclosure.

What is claimed is:

1. A stability control method based on particle active disturbance rejection, comprising:
establishing an active disturbance rejection controller model according to a dynamic model and a speed loop control model of a tethered balloon system, wherein the speed loop control model is established through theoretical modeling of executive components of a control system of the tethered balloon system; and optimizing to-be-optimized parameters of the active disturbance rejection controller model using a particle swarm optimization algorithm, and determining an optimal active disturbance rejection controller model;

optimizing, based the optimal active disturbance rejection controller model, an active disturbance rejection controller; and performing stability control on a photoelectric pod of the tethered balloon system through the active disturbance rejection controller;

wherein the active disturbance rejection controller model is expressed as:

$$\ddot{y} = f(y, \dot{y}, w(k), k) + bu;$$

$$TD: \begin{cases} fh = fhan(x_1(k) - v(k), x_2(k), r, h_0) \\ x_1(k+1) = x_1(k) + hx_2(k) \\ x_2(k+1) = x_2(k) + hfh \end{cases};$$

$$ESO: \begin{cases} e(k) = z_1(k) - y(k) \\ z_1(k+1) = z_1(k) + h(z_2(k) - \beta_{01}e(k)) \\ z_2(k+1) = z_2(k) + h(z_3(k) - \beta_{02}fal(e(k), 0.5, \delta) + bu(k)) \\ z_3(k+1) = z_3(k) - h\beta_{03}fal(e(k), 0.25, \delta) \end{cases};$$

$$NLSEF: \begin{cases} e_1(k) = x_1(k) - z_1(k) \\ e_2(k) = x_2(k) - z_2(k) \\ u_0(k) = fhan(e_1, ce_2, r_1, h_1) \end{cases};$$

$$u(k) = u_0(k) - z_3(k)/b_0;$$

$$fhan(x_1, x_2, r, h) = \begin{cases} d = rh^2 \\ a_0 = hx_2 \\ y = x_1 + a_0 \\ a_1 = \sqrt{d(d+8|y|)} \\ a_2 = a_0 + \text{sign}(y)(a_1 - d)/2 \\ s_y = [\text{sign}(y+d) - \text{sign}(y-d)]/2 \\ a = (a_0 + y - a_2)s_y + a_2 \\ s_a = [\text{sign}(y+d) - \text{sign}(y-d)]/2 \\ fhan = -r\left[\frac{a}{d} - \text{sign}(a)\right]s_a - r\text{sign}(a) \end{cases};$$

$$fal(x, a, d) = \begin{cases} \frac{x}{d^{(1-a)}}, & |x| \le d \\ \text{sign}(x)|x|^a, & |x| > d \end{cases};$$

where $\ddot{y}$ represents a differential equation of a control system of the photoelectric pod; TD represents a tracking differentiator; ESO represents an extended state observer; NLSEF represents a nonlinear state error feedback control law; $f(y, \dot{y}, w(k), k)$ represents a total disturbance; $v(k)$ represents a system input signal; y represents an output signal; $w(k)$ represents a total external disturbance; differential signals $v_1(k)$ and $v_2(k)$ are generated by the TD through converting the system input signal $v(k)$; $z_1(k)$, $z_2(k)$, and $z_3(k)$ respectively represent estimators of the differential signals $v_1(k)$ and $v_2(k)$, and the total disturbance $f(y, \dot{y}, w(t), t)$; r, h, $h_0$ are parameters of the TD; r represents a fast factor; h represents a system sampling step size; $h_0$ represents a dimensionless parameter, which is an integer multiple of the system sampling step size h; h, $\beta_{01}$, $\beta_{02}$, $\beta_{03}$, $\delta$, b are parameters of the ESO; $\beta_{01}$, $\beta_{02}$, $\beta_{03}$ are coefficient parameters related to the system sampling step size h; $\delta$ represents a coefficient, which is taken as an integer multiple of the system sampling step size h; b represents a control quantity coefficient and is a time-varying function, which is a constant $b_0$ approximately; c, $r_1$, $h_1$ are parameters of the NLSEF, where c represents a damping factor, $h_1$ represents a fast factor, and $r_1$ represents a control quantity factor; fhan and fal are expressions of nonlinear functions, respectively; u represents a controlled object; $u_0(t)$ represents an error feedback control quantity; a, $a_0$, $a_1$ and $a_2$ are dimensionless intermediate parameters;

wherein the to-be-optimized parameters of the active disturbance rejection controller model comprises $\beta_{01}$, $\beta_{02}$, $\beta_{03}$, c, $h_1$;

wherein the optimizing to-be-optimized parameters of the active disturbance rejection controller model using the particle swarm optimization algorithm, comprises:

step 1, initializing a particle swarm;

step 2, calculating a fitness value of each particle in the particle swarm according to a fitness function, wherein each particle corresponds to a combination of the to-be-optimized parameters;

step 3, updating, according to the fitness value of each particle, an individual extreme value of the particle and a global extreme value;

step 4, updating a position and a speed of each particle;

step 5, determining whether a stop condition is satisfied, outputting an optimal parameter combination, if it is determined that the stop condition is satisfied; returning to and performing the step 2, if it is determined that the stop condition is not satisfied;

wherein the fitness value of each particle is determined according to the following formula:

$$\begin{cases} \text{If } \Delta e(t) < 0 \\ Q = \int_0^t [c_1 t|e(t)| + c_2 u(t)^2 + 100|\Delta e(t)|] dt \end{cases},$$

where e(t) represents a deviation between a given value inputted into the fitness function and an output corresponding to the given value of the fitness function; $\Delta e(t)$ represents a difference between two adjacent step outputs of the fitness function; $c_1$ represents a weight of the deviation e(t) in the fitness function, and $c_2$ represents a weight of a square term of the error feedback control quantity in the fitness function; u(t) represents the error feedback control quantity; and Q represents an objective function value;

wherein during the optimizing, a weight factor w is dynamically adjusted according the following formula:

$$w = w_{max} - \frac{(w_{max} - w_{min}) \cdot t}{T_{max}},$$

where $T_{max}$ represents a maximum iteration number, $w_{max}$ and $w_{min}$ represent a maximum inertia weight and a minimum inertia weight respectively, and t represents a current iteration number.

2. The stability control method based on particle active disturbance rejection according to claim 1, wherein the dynamic model of the tethered balloon system consists of: a transient motion equation of the tethered balloon, a boundary condition of an anchor point, a boundary condition of a master node, a steady motion equation of the tethered balloon, and a differential coupling dynamic equation of a cable.

3. The stability control method based on particle active disturbance rejection according to claim 2, wherein the transient motion equation of the tethered balloon is expressed as the following formula:

$$M_1 \dot{V} + C_{RB} V = \tau_{RB};$$

wherein the boundary condition of the anchor point is expressed as the following formula:

$$[V_{x0}\ V_{y0}\ V_{z0}]^T = (L_{ce})^T [V_{t0}\ V_{n0}\ V_{b0}]^T;$$

wherein the boundary condition of the master node is expressed as the following formula:

$$L_{ce}[V_{tN}\ V_{nN}\ V_{bN}]^T = V_B + \omega \times R_B;$$

wherein a dynamic equation of the cable is expressed as the following formula:

$$M \frac{\partial Y}{\partial s} = N \frac{\partial Y}{\partial t} + q;$$

wherein the steady motion equation of the tethered balloon is expressed as the following formula:

$$\begin{bmatrix} p \\ q \\ r \end{bmatrix} = \begin{bmatrix} 1 & 0 & -\sin\theta \\ 0 & \cos\phi & \sin\phi\cos\theta \\ 0 & -\sin\phi & \cos\phi\cos\theta \end{bmatrix} \begin{bmatrix} \dot{\phi} \\ \dot{\theta} \\ \dot{\psi} \end{bmatrix};$$

wherein the differential coupling dynamic equation of the cable is expressed as the following formula:

$$M_{j+1/2}^i (Y_{j+1}^i - Y_j^i)/\Delta S + M_{j+1/2}^{i+1}(Y_{j+1}^{i+1} - Y_j^{i+1})/\Delta S =$$
$$N_j^{i+1/2}(Y_j^{i+1} - Y_j^i)/\Delta t + N_{j+1}^{i+1/2}(Y_{j+1}^{i+1} - Y_{j+1}^i)/\Delta t + q_{j+1/2}^i + q_{j+1/2}^{i+1}$$
$$Y_{j+1/2} = \frac{1}{2}(Y_j + Y_{j+1}),$$

where $M_1$ represents a mass matrix, M and N represent intermediate result matrices; q represents a force matrix; Y represents a state matrix $[T\ V_t\ V_n\ V_b\ \beta\ \gamma]^T$ of the cable, where $\beta$ represents an azimuth angle of the cable, $\gamma$ represents an inclination angle of the cable, $V_n$, $V_b$, and $V_t$ respectively represent components of a speed of the cable in a local coordinate system of the cable (CFS); $\tau_{RB}$ represents a projection of a sum of an inertia force and an aerodynamic force of the cable in a body axis system of the tethered balloon (BFS); V represents a speed of a sphere of the tethered balloon in the BFS; $\dot{V}$ is a derivative of V; $C_{RB}$ represents a dynamic moment of rotation; $[V_{t0}\ V_{n0}\ V_{b0}]^T$ represents a speed of the cable in the CFS; $L_{ce}$ represents a coordinate transformation matrix between a ground coordinate system of anchor point (EFS) and the CFS; $[V_{x0}\ V_{y0}\ V_{z0}]^T$ represents a speed of the anchor point in the EFS; $[V_{tN}\ V_{nN}\ V_{bN}]^T$ represents a speed of the n-th node in the CFS; $R_B$ represents a vector of a master node B in the BFS; $V_B$ represents a speed of the master node B in the BFS; and $\omega$ represents a motor angular velocity of a rotating shaft of the photoelectric pod; [p, q, r] respectively represents rotational angular velocities of the tethered balloon in the BFS, and $\psi$, $\theta$, $\phi$ represents a yaw angle, a pitch angle and a roll angle of the sphere of the tethered balloon, respectively; $M_j^i$, $N_j^i$, $q_j^i$, and $Y_j^i$ are corresponding values in a moment i and at a position j; ΔS represents a micro segmentation of the cable; and Δt represents a micro segmentation of time.

4. The stability control method based on particle active disturbance rejection according to claim 1, wherein the speed loop control model comprises: a motor transfer function of a rotating shaft of the photoelectric pod, a transfer function of a speed gyro, and a transfer function of a power amplifier.

5. The stability control method based on particle active disturbance rejection according to claim 4, wherein the motor transfer function is expressed as the following formula:

$$G'(s) = \frac{w(s)}{U_a(s)} = \frac{C_m}{JL_a s^2 + JR_a s + C_e C_m};$$

wherein the transfer function of the speed gyro is expressed as the following formula:

$$G''(s) = G_g(s);$$

wherein the transfer function of the power amplifier is expressed as the following formula:

$$G'''(s) = K_{pwm};$$

where G'(s), G''(s), and G'''(s) represent the motor transfer function, the transfer function of the speed gyro, and the transfer function of the power amplifier, respectively; $L_a$ represents an armature winding inductance; J represents a total moment of inertia on a motor shaft; $C_m$ represents a motor torque coefficient; $C_e$ represents a motor electromotive force coefficient; $R_a$ represents an armature winding resistance; w(s) represents a Laplace transformation of an output angular velocity; $U_a(s)$ represents a Laplace transformation of an input; $G_g(s)$ represents a proportional component of the speed gyro; and $K_{pwm}$ represents a proportional amplification component of the power amplifier.

6. An electronic device, comprising:

a processor; and a memory with a computer program stored therein, wherein the computer program, when executed by the processor, is configured to implement a stability control method based on particle active disturbance rejection, comprising:

establishing an active disturbance rejection controller model according to a dynamic model and a speed loop control model of a tethered balloon system, wherein the speed loop control model is established through theoretical modeling of executive components of a control system of the tethered balloon system; and optimizing to-be-optimized parameters of the active disturbance rejection controller model using a particle swarm optimization algorithm, and determining an optimal active disturbance rejection controller model;

optimizing, based the optimal active disturbance rejection controller model, an active disturbance rejection controller; and performing stability control on a photoelectric pod of the tethered balloon system through the active disturbance rejection controller;

wherein the active disturbance rejection controller model is expressed as:

$$\ddot{y} = f(y, \dot{y}, w(k), k) + bu;$$

$$TD: \begin{cases} fh = fhan(x_1(k) - v(k), x_2(k), r, h_0) \\ x_1(k+1) = x_1(k) + hx_2(k) \\ x_2(k+1) = x_2(k) + hfh \end{cases};$$

$$ESO: \begin{cases} e(k) = z_1(k) - y(k) \\ z_1(k+1) = z_1(k) + h(z_2(k) - \beta_{01} e(k)) \\ z_2(k+1) = z_2(k) + h(z_3(k) - \beta_{02} fal(e(k), 0.5, \delta) + bu(k)) \\ z_3(k+1) = z_3(k) - h\beta_{03} fal(e(k), 0.25, \delta) \end{cases};$$

$$NLSEF: \begin{cases} e_1(k) = x_1(k) - z_1(k) \\ e_2(k) = x_2(k) - z_2(k) \\ u_0(k) = fhan(e_1, ce_2, r_1, h_1) \end{cases};$$

$$u(k) = u_0(k) - z_3(k)/b_0;$$

$$fhan(x_1, x_2, r, h) = \begin{cases} d = rh^2 \\ a_0 = hx_2 \\ y = x_1 + a_0 \\ a_1 = \sqrt{d(d + 8|y|)} \\ a_2 = a_0 + \text{sign}(y)(a_1 - d)/2 \\ s_y = [\text{sign}(y + d) - \text{sign}(y - d)]/2 \\ a = (a_0 + y - a_2)s_y + a_2 \\ s_a = [\text{sign}(y + d) - \text{sign}(y - d)]/2 \\ fhan = -r\left[\frac{a}{d} - \text{sign}(a)\right]s_a - r\,\text{sign}(a) \end{cases};$$

$$fal(x, a, d) = \begin{cases} \frac{x}{d^{(1-a)}}, & |x| \le d \\ \text{sign}(x)|x|^a, & |x| > d \end{cases};$$

where ÿ represents a differential equation of a control system of the photoelectric pod; TD represents a tracking differentiator; ESO represents an extended state observer; NLSEF represents a nonlinear state error feedback control law; f(y, ẏ, w(k), k) represents a total disturbance; v(k) represents a system input signal; y represents an output signal; w(k) represents a total external disturbance; differential signals $v_1(k)$ and $v_2(k)$ are generated by the TD through converting the system input signal v(k); $z_1(k)$, $z_2(k)$, and $z_3(k)$ respectively represent estimators of the differential signals $v_1(k)$ and $v_2(k)$, and the total disturbance f(y, ẏ, w(t), t); r, h, $h_0$ are parameters of the TD; r represents a fast factor; h represents a system sampling step size; $h_0$ represents a dimensionless parameter, which is an integer multiple of the system sampling step size h; h, $\beta_{01}$, $\beta_{02}$, $\beta_{03}$, δ, b are parameters of the ESO; $\beta_{01}$, $\beta_{02}$, $\beta_{03}$ are coefficient parameters related to the system sampling step size h; δ represents a coefficient, which is taken as an integer multiple of the system sampling step size h; b represents a control quantity coefficient and is a time-varying function, which is a constant $b_0$ approximately; c, $r_1$, $h_1$ are parameters of the NLSEF, where c represents a damping factor, $h_1$ represents a fast factor, and $r_1$ represents a control quantity factor; fhan and fal are expressions of nonlinear functions, respectively; u represents a controlled object; $u_0(t)$ represents an error feedback control quantity; a, $a_0$, $a_1$ and $a_2$ are dimensionless intermediate parameters;

wherein the to-be-optimized parameters of the active disturbance rejection controller model comprises $\beta_{01}$, $\beta_{02}$, $\beta_{03}$, c, $h_1$;

wherein the optimizing to-be-optimized parameters of the active disturbance rejection controller model using the particle swarm optimization algorithm, comprises:

step 1, initializing a particle swarm;

step 2, calculating a fitness value of each particle in the particle swarm according to a fitness function, wherein each particle corresponds to a combination of the to-be-optimized parameters;

step 3, updating, according to the fitness value of each particle, an individual extreme value of the particle and a global extreme value;

step 4, updating a position and a speed of each particle;

step 5, determining whether a stop condition is satisfied, outputting an optimal parameter combination, if it is determined that the stop condition is satisfied; returning to and performing the step 2, if it is determined that the stop condition is not satisfied;

wherein the fitness value of each particle is determined according to the following formula:

$$\begin{cases} \text{If } \Delta e(t) < 0 \\ Q = \int_0^\infty [c_1 t|e(t)| + c_2 u(t)^2 + 100|\Delta e(t)|] dt \end{cases},$$

where e(t) represents a deviation between a given value inputted into the fitness function and an output corresponding to the given value of the fitness function; Δe(t) represents a difference between two adjacent step outputs of the fitness function; $c_1$ represents a weight of the deviation e(t) in the fitness function, and $c_2$ represents a weight of a square term of the error feedback control quantity in the fitness function; u(t) represents the error feedback control quantity; and Q represents an objective function value;

wherein during the optimizing, a weight factor w is dynamically adjusted according the following formula:

$$w = w_{max} - \frac{(w_{max} - w_{min}) \cdot t}{T_{max}},$$

where $T_{max}$ represents a maximum iteration number, $w_{max}$ and $w_{min}$ represent a maximum inertia weight and a minimum inertia weight respectively, and t represents a current iteration number.

7. A non-transitory computer-readable storage medium with a computer program stored thereon, wherein the computer program, when executed by a processor, is configured to perform a stability control method based on particle active disturbance rejection, comprising:

establishing an active disturbance rejection controller model according to a dynamic model and a speed loop control model of a tethered balloon system, wherein the speed loop control model is established through theoretical modeling of executive components of a control system of the tethered balloon system; and optimizing to-be-optimized parameters of the active disturbance rejection controller model using a particle swarm optimization algorithm, and determining an optimal active disturbance rejection controller model;

optimizing, based the optimal active disturbance rejection controller model, an active disturbance rejection controller; and performing stability control on a photoelectric pod of the tethered balloon system through the active disturbance rejection controller;

wherein the active disturbance rejection controller model is expressed as:

$$\ddot{y} = f(y, \dot{y}, w(k), k) + bu;$$

$$TD: \begin{cases} fh = fhan(x_1(k) - v(k), x_2(k), r, h_0) \\ x_1(k+1) = x_1(k) + hx_2(k) \\ x_2(k+1) = x_2(k) + hfh \end{cases};$$

$$ESO: \begin{cases} e(k) = z_1(k) - y(k) \\ z_1(k+1) = z_1(k) + h(z_2(k) - \beta_{01} e(k)) \\ z_2(k+1) = z_2(k) + h(z_3(k) - \beta_{02} fal(e(k), 0.5, \delta) + bu(k)) \\ z_3(k+1) = z_3(k) - h\beta_{03} fal(e(k), 0.25, \delta) \end{cases};$$

$$NLSEF: \begin{cases} e_1(k) = x_1(k) - z_1(k) \\ e_2(k) = x_2(k) - z_2(k) \\ u_0(k) = fhan(e_1, ce_2, r_1, h_1) \end{cases};$$

$$u(k) = u_0(k) - z_3(k)/b_0;$$

$$fhan(x_1, x_2, r, h) = \begin{cases} d = rh^2 \\ a_0 = hx_2 \\ y = x_1 + a_0 \\ a_1 = \sqrt{d(d+8|y|)} \\ a_2 = a_0 + \text{sign}(y)(a_1 - d)/2 \\ s_y = [\text{sign}(y+d) - \text{sign}(y-d)]/2 \\ a = (a_0 + y - a_2)s_y + a_2 \\ s_a = [\text{sign}(y+d) - \text{sign}(y-d)]/2 \\ fhan = -r\left[\frac{a}{d} - \text{sign}(a)\right]s_a - r\text{sign}(a) \end{cases};$$

$$fal(x, a, d) = \begin{cases} \frac{x}{d^{(1-a)}}, |x| \le d \\ \text{sign}(x)|x|^a, |x| > d \end{cases};$$

where ÿ represents a differential equation of a control system of the photoelectric pod; TD represents a tracking differentiator; ESO represents an extended state observer; NLSEF represents a nonlinear state error feedback control law; f(y, ẏ, w(k), k) represents a total disturbance; v(k) represents a system input signal; y represents an output signal; w(k) represents a total external disturbance; differential signals $v_1$(k) and $v_2$(k) are generated by the TD through converting the system input signal v(k); $z_1$(k), $z_2$(k), and $z_3$(k) respectively represent estimators of the differential signals $v_1$(k) and $v_2$(k), and the total disturbance f(y, ẏ, w(t), t); r, h, $h_0$ are parameters of the TD; r represents a fast factor; h represents a system sampling step size; $h_0$ represents a dimensionless parameter, which is an integer multiple of the system sampling step size h; h, $\beta_{01}$, $\beta_{02}$, $\beta_{03}$, δ, b are parameters of the ESO; $\beta_{01}$, $\beta_{02}$, $\beta_{03}$ are coefficient parameters related to the system sampling step size h; δ represents a coefficient, which is taken as an integer multiple of the system sampling step size h; b represents a control quantity coefficient and is a time-varying function, which is a constant $b_0$ approximately; c, $r_1$, $h_1$ are parameters of the NLSEF, where c represents a damping factor, $h_1$ represents a fast factor, and $r_1$ represents a control quantity factor; fhan and fal are expressions of nonlinear functions, respectively; u represents a controlled object; $u_0$(t) represents an error feedback control quantity; a, $a_0$, $a_1$ and $a_2$ are dimensionless intermediate parameters;

wherein the to-be-optimized parameters of the active disturbance rejection controller model comprises, $\beta_{01}$, $\beta_{02}$, $\beta_{03}$, c, $h_1$;

wherein the optimizing to-be-optimized parameters of the active disturbance rejection controller model using the particle swarm optimization algorithm, comprises:

step 1, initializing a particle swarm;
step 2, calculating a fitness value of each particle in the particle swarm according to a fitness function, wherein each particle corresponds to a combination of the to-be-optimized parameters;
step 3, updating, according to the fitness value of each particle, an individual extreme value of the particle and a global extreme value;
step 4, updating a position and a speed of each particle;
step 5, determining whether a stop condition is satisfied, outputting an optimal parameter combination, if it is determined that the stop condition is satisfied; returning to and performing the step 2, if it is determined that the stop condition is not satisfied;
wherein the fitness value of each particle is determined according to the following formula:

$$\begin{cases} \text{If } \Delta e(t) < 0 \\ Q = \int_0^t [c_1 t |e(t)| + c_2 u(t)^2 + 100|\Delta e(t)|] dt \end{cases},$$

where e(t) represents a deviation between a given value inputted into the fitness function and an output corresponding to the given value of the fitness function; $\Delta e(t)$ represents a difference between two adjacent step outputs of the fitness function; $c_1$ represents a weight of the deviation e(t) in the fitness function, and $c_2$ represents a weight of a square term of the error feedback control quantity in the fitness function; u(t) represents the error feedback control quantity; and Q represents an objective function value;
wherein during the optimizing, a weight factor w is dynamically adjusted according the following formula:

$$w = w_{max} - \frac{(w_{max} - w_{min}) \cdot t}{T_{max}},$$

where $T_{max}$ represents a maximum iteration number, $w_{max}$ and $w_{min}$ represent a maximum inertia weight and a minimum inertia weight respectively, and t represents a current iteration number.

\* \* \* \* \*